United States Patent
Goss et al.

(10) Patent No.: US 8,832,402 B2
(45) Date of Patent: Sep. 9, 2014

(54) SELF-INITIATED SECURE ERASURE RESPONSIVE TO AN UNAUTHORIZED POWER DOWN EVENT

(75) Inventors: Ryan James Goss, Prior Lake, MN (US); David Scott Seekins, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 276 days.

(21) Appl. No.: 13/098,062

(22) Filed: Apr. 29, 2011

(65) Prior Publication Data

US 2012/0278579 A1 Nov. 1, 2012

(51) Int. Cl.
*G06F 21/00* (2013.01)
*G06F 12/02* (2006.01)

(52) U.S. Cl.
CPC .... *G06F 12/0246* (2013.01); *G06F 2212/7205* (2013.01)
USPC .......................................... 711/166; 711/163

(58) Field of Classification Search
None
See application file for complete search history.

(56) References Cited

U.S. PATENT DOCUMENTS

| | | | |
|---|---|---|---|
| 7,152,095 B1 * | 12/2006 | Motoyama et al. | 709/212 |
| 2002/0053090 A1 * | 5/2002 | Okayama et al. | 725/152 |
| 2005/0228938 A1 * | 10/2005 | Khare et al. | 711/103 |
| 2006/0072244 A1 | 4/2006 | Rapp | |
| 2006/0080494 A1 * | 4/2006 | Kawaguchi et al. | 711/4 |
| 2008/0140910 A1 * | 6/2008 | Flynn et al. | 711/100 |
| 2009/0031095 A1 * | 1/2009 | Merry et al. | 711/159 |
| 2009/0113136 A1 * | 4/2009 | Aharonov | 711/135 |
| 2009/0196100 A1 | 8/2009 | Merry, Jr. et al. | |
| 2009/0259808 A1 * | 10/2009 | Koren et al. | 711/103 |

* cited by examiner

*Primary Examiner* — Matthew Bradley
*Assistant Examiner* — Candice Rankin
(74) *Attorney, Agent, or Firm* — Hall Estill Attorneys at Law

(57) ABSTRACT

Method and apparatus for self-initiated secure erasure of data from a non-volatile memory, such as a solid state drive (SSD). In accordance with various embodiments, the memory is operated in communication with a host device. A self-initiated, non-destructive secure erasure of the data stored in the memory is carried out responsive to a detection of an unauthorized power down event associated with the memory.

20 Claims, 4 Drawing Sheets

US 8,832,402 B2

SELF-INITIATED SECURE ERASURE RESPONSIVE TO AN UNAUTHORIZED POWER DOWN EVENT

SUMMARY

Various embodiments of the present invention are generally directed to a method and apparatus for securely erasing data from a memory, such as in a solid state drive (SSD).

In accordance with various embodiments, the memory is operated in communication with a host device. A self-initiated, non-destructive secure erasure of the data stored in the memory is carried out responsive to a detection of an unauthorized power down event associated with the memory.

These and other features and aspects which characterize the various embodiments of the present invention can be understood in view of the following detailed discussion and the accompanying drawings.

DETAILED DESCRIPTION

The present disclosure generally relates to data security, and more particularly to a method and apparatus for securely erasing copies of data from a memory.

Memory devices, such as hard disc drives (HDDs), solid-state drives (SSDs), flash memory "thumb" drives, etc., are used in a wide number of consumer, commercial, governmental and military applications. Data security can be an important consideration in operating such devices.

It may be desirable from time to time to subject a memory to a special data sanitizing operation to remove data from the memory. "Sanitizing," or "securely erasing," a memory generally refers to an operation whereby all traces of a data set, including identical copies, prior revisions and in some cases associated metadata, are purged or otherwise altered so that the data cannot be easily recovered by an unauthorized third party. A number of U.S. Federal and State Regulations require memory devices to be securely erased under certain circumstances. Failure to do so may result in civil and/or criminal penalty. Some well-known governmental standards that set forth various requirements for secure erasure include the NIST 800-88 Enhanced Secure Erase Standard and the DoD 5220 Block Erasure Standard.

Many existing secure erasure techniques rely on an externally generated, host level command to initiate a data sanitizing operation. This presents a weakness in the data security scheme. For example, if an unscrupulous attacker is able to interrupt communications between the storage device and the host prior to the host being able to successfully transmit a data sanitization command, sensitive data may be easily recoverable from the storage device.

Accordingly, various embodiments of the present invention are generally directed to a method and apparatus for carrying out a secure erasure of data from a memory. As explained below, a storage device self-initiates a secure erasure responsive to the detection of an unauthorized power down event. The erasure methodology may be cascaded so that multiple types of sanitizing operations are applied to the data.

Figure 1:
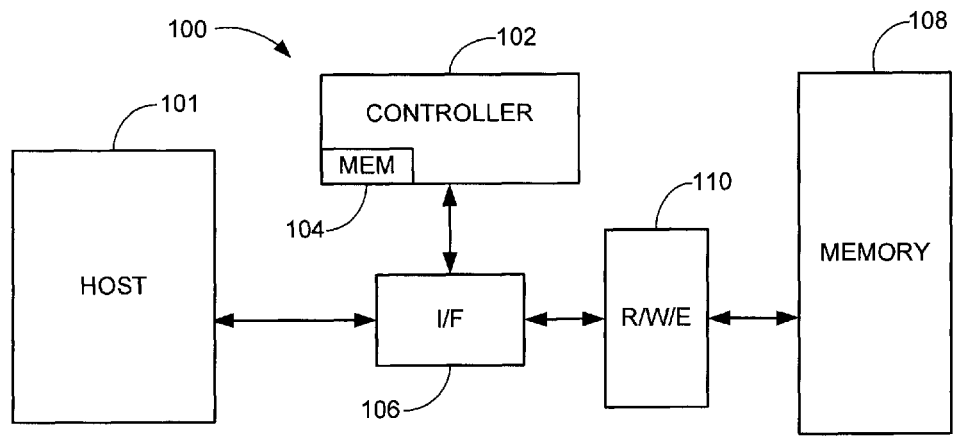
FIG. 1 is a block diagram for a data storage device.

FIG. 1 which illustrates an exemplary data storage device 100 constructed and operated in accordance with various embodiments. For purposes of the present discussion, the device 100 will be characterized as a solid state drive (SSD) that utilizes NAND flash memory to provide non-volatile storage of user data from a host device. It will be appreciated that other forms of storage devices can be utilized, so FIG. 1 is merely exemplary and not limiting.

The storage device 100 is shown to be operationally coupled to a host device 101. The host 101 can take a variety of forms. In some embodiments, the host may be a personal computer or similar processing device, in which case the storage device may serve as a peripheral data storage component for the host. In other embodiments, the host may be a handheld electronic device such as a portable camera or communication device. The storage device may be incorporated physically within the confines of the host, or may be connected remotely to the host through a computer network.

The storage device 100 includes a programmable controller 102 that uses programming in local memory 104 to provide top level control of the device 100. The controller coordinates commands and data transfers with the host through an interface (I/F) circuit 106. The I/F may include data buffering and back end processing capabilities to facilitate data transfers with a main memory 108 through a read/write/erase (R/W/E) circuit 110.

Figure 2:
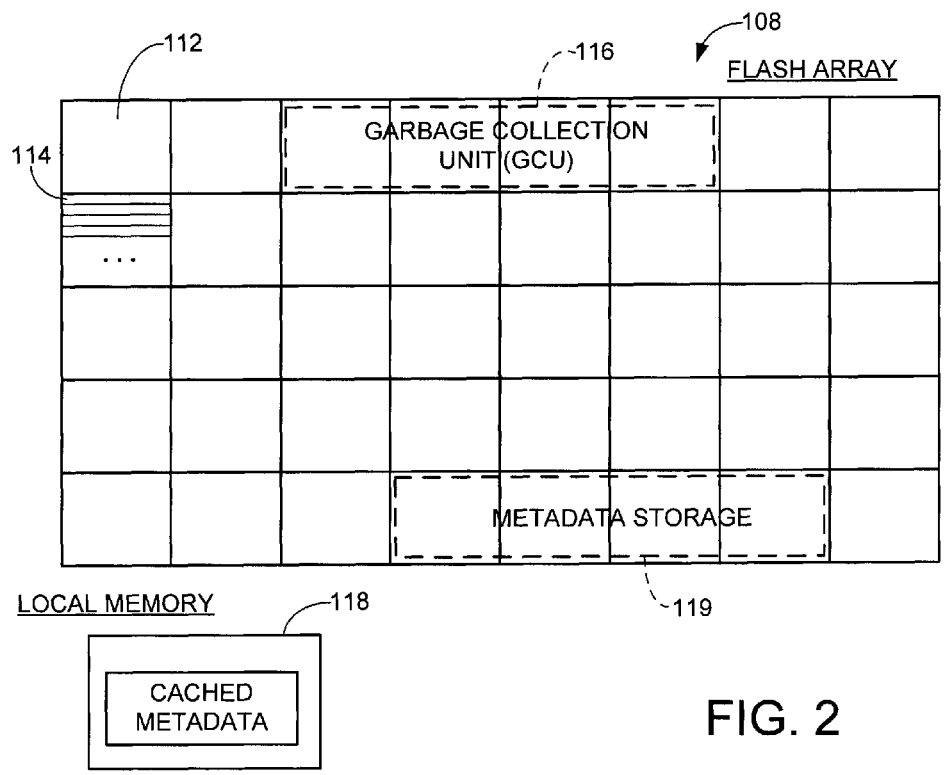
FIG. 2 illustrates a memory structure of the device of FIG. 1.

FIG. 2 shows one embodiment of the main memory of FIG. 1 as a flash memory array. The array 108 is arranged into erasure blocks 112 which are individually erasable prior to allocation. Each block 112 includes a number of pages 114 of fixed size memory. An exemplary block size is 128 pages of 8KiB (8192 bytes). In some embodiments, each page constitutes a row of flash memory cells coupled to a common word line. Read and write operations take place on a page-by-page basis.

The erasure blocks 112 may be arranged on different chips, dies, layers, etc. Garbage collection units (GCUs) 116 can be formed from a selected number of blocks 112 which are allocated and erased as a unit.

FIG. 2 further shows a local memory 118, which may take a number of alternate forms such as volatile dynamic random access memory (DRAM) or non-volatile random access memory (NVRAM). The local memory 118 may be incorporated into the flash array 108, or may be located elsewhere within the device 100 such as within the I/F circuit 106 or controller memory 104 (FIG. 1). The local memory 118 is shown to store a selected portion of cached metadata.

The metadata are used to track the locations of user data stored to the flash array 108. While not limiting, it will be contemplated that the user data are arranged as fixed sized blocks of user data that are uniquely identified by logical block addresses (LBAs). Other forms of logical addressing may be used, so the use of LBAs is merely exemplary and not limiting. The metadata may be appended to each erasure block 112, or may be stored separately in specially denoted erasure blocks such as at 119.

In the exemplary system 100, host read requests are issued in terms of LBAs. The host 101 issues a read command with an identification of a selected range of LBAs to be returned to the host (e.g., "read LBAs 100-199"). The device 100 will use the metadata to convert the logical addresses of the LBAs to physical block addresses (PBAs) indicative of the physical location where the associated data are stored. The physical block addresses may be expressed in terms of a particular GCU, block, page, bit offset, etc. sufficient to identify the physical location of the user data. The system will then retrieve the user data from the identified physical location and transfer the data to the host.

It is contemplated that the local memory 118 will not have sufficient storage capacity to retain a copy of all of the metadata in the system at a given time. Hence, memory access and swap operations may take place in the background to move the appropriate metadata from the flash array 108 to the local memory 118 on an as-needed basis. Suitable metadata tables and other data structures can be used to facilitate such operations.

Write requests from the host 101 are also issued in terms of LBAs (e.g., "write LBAs 100-199"). The host 101 will supply a write command along with the associated user data to be written. The storage device 100 will process and write the user data to a suitable location within the flash array 108, such as the next available page(s) in the most recently allocated GCU. Metadata will be generated and stored to describe the location and status of the written data.

Figure 3:
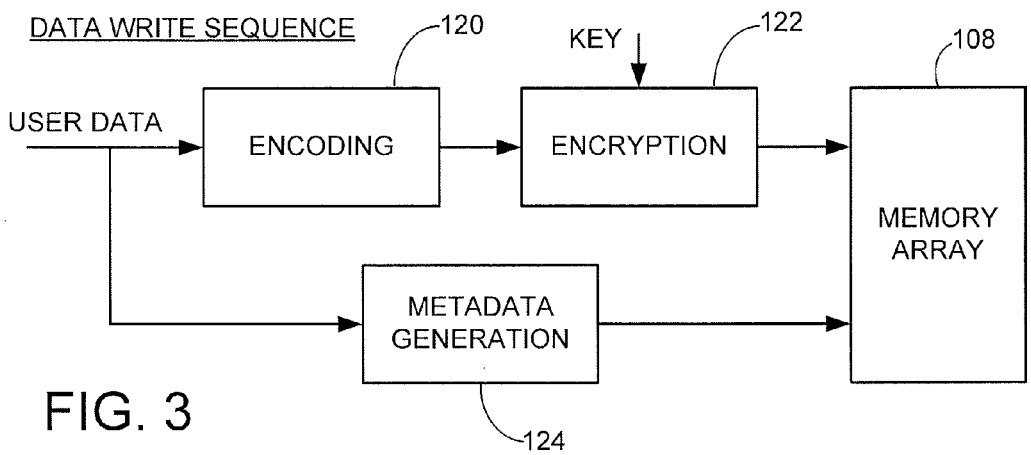
FIG. 3 is an exemplary write sequence.

FIG. 3 illustrates an exemplary data write sequence in accordance with some embodiments. Input user data may be subjected to an encoding operation by encoding block 120. This encoding may take a variety of forms, such as the use of error correction codes (ECC), data compression, etc. The encoded data may thereafter be encrypted by an encryption block 122. A variety of encryption approaches may be utilized, including multi-level encryption. The encrypted data are thereafter stored in an appropriate location in the memory array 108 by the application of appropriate write signals.

As desired, a read-write-verify operation can be carried out to ensure the data are correctly written to the array. Writeback caching may also be employed so that the device temporarily caches the user data and immediately informs the host that the data have been written, and then schedules the actual writing of the data at a subsequent time.

A metadata generator block 124 concurrently operates to generate appropriate metadata associated with the encoded, encrypted user data. The metadata are stored in an appropriate location within the memory array 108 or other suitable location within the device 100.

Figure 4:
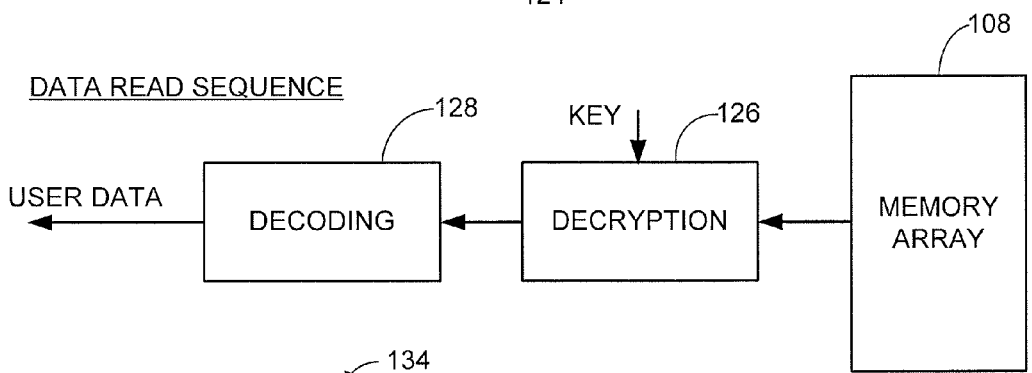
FIG. 4 is an exemplary read sequence.

FIG. 4 illustrates an exemplary data read sequence to subsequently return user data to the host 101 stored by the sequence in FIG. 3. Although not specifically depicted in FIG. 4, it will be understood that the read sequence includes accessing of the pertinent metadata to locate the physical location of the stored user data in the array 108. Appropriate signals are applied to read out the stored data. A decryption block 126 applies decryption to the recovered readback data, and a decoding block 128 applies appropriate decoding steps (e.g., error correction, data expansion). The recovered user data are thereafter returned to the host.

Each time a new set of data are written to the memory array for a given logical address (e.g., a particular set of LBAs), the data will generally be written to a new physical location. If multiple copies of a particular data set are present in the array 108, including a most current copy and older, stale versions of the data, then ideally the metadata control system will operate to ensure that the older, stale versions of the data are ignored and only the most current copy of the data is returned. It will be appreciated that the greater the number of copies (including revisions) in the system, generally the greater the effort that will need to be employed to securely erase the data from the memory.

It is contemplated that the device 100 is configured to carry out data sanitizing operations from time to time on selected sets of data responsive to external sanitizing commands from the host 101. For example, the host 101 may issue a data sanitize command to the storage device 100 along with the designation of a selected range of LBAs to be removed (e.g., "sanitize LBAs 100-199"). In response, the device 100 can operate to access the metadata and locate the number of physical copies of the data, including the most current version and all older (stale) copies (an "extended data set"), and then proceed to remove the extended data set from the system. This selective sanitizing operation may also remove the metadata associated with the extended data set. The selective sanitizing operation will leave undisturbed other, previously stored data in the memory array.

It is further contemplated that the device 100 is configured to receive an external command from the host to sanitize the entire data array 108 (e.g., "sanitize all LBAs from memory"). The device is configured to operate responsive to receipt of this external sanitize command to remove of all of the host data stored to the array.

In accordance with various embodiments, the device 100 further has the capability of performing a self-initiated secure erasure of data from the memory array independently of any host command to initiate such operation. This self-initiated secure erasure is carried out responsive to the detection of a power down event associated with the memory, indicative of an unauthorized third party attempting functional or physical access of the device.

Figure 5:
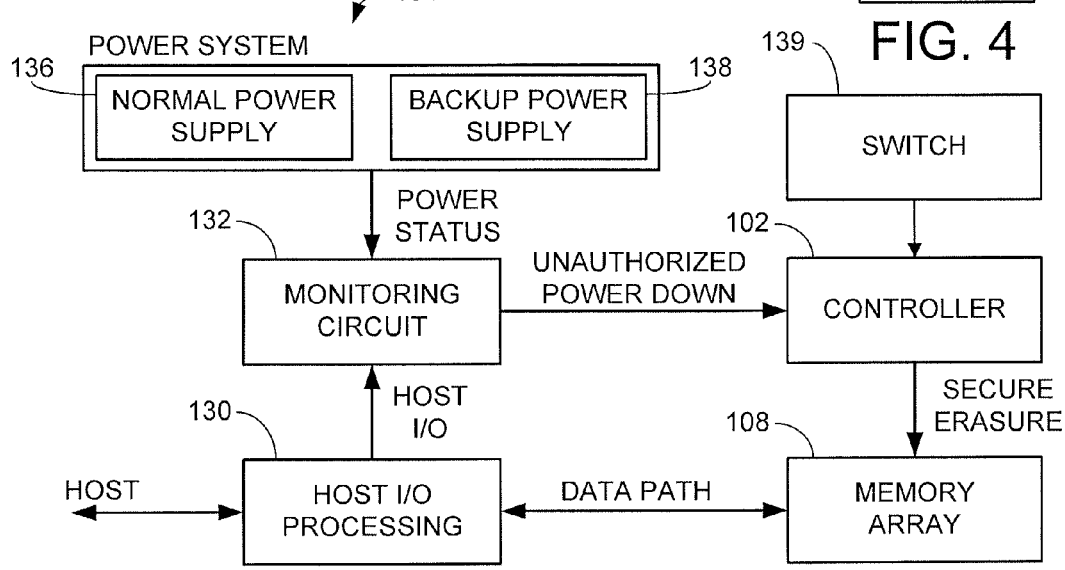
FIG. 5 shows an exemplary monitoring circuit which detects an unauthorized power down event and commences a secure erasure operation in accordance with various embodiments.

FIG. 5 shows further aspects of the exemplary storage device 100 adapted to support a self-initiated secure erasure of data. A host I/O processing block 130 represents various aspects of the device 100 used in the processing and transfer of data between the host 101 and the memory 108, such as the I/F circuit 106 and the R/W/E channel 110 of FIG. 1. FIG. 5 further shows a monitoring circuit 132 which monitors host I/O activity during normal operation of the device. As explained below, the self-initiated secure erasure may be commenced responsive to a detected disruption in host-device communications.

The exemplary monitoring circuit 132 is shown to further monitor a power status from a power system 134 of the device 100. The power system 134 supplies electrical dc power for use by the device 100 during both normal operation and during the self-initiated erasure operation of the device. To this end, the power system 134 may include a normal power supply block 136 and a backup power supply block 138.

The normal power supply block 136 may represent the direct input of dc power from the host (such as via a USB connection), a separate ac/dc power converter unit, local batteries installed in the device 100, etc. The backup power supply block 138 provides temporary power for the system during the self-initiated secure erasure operation and may be realized as a battery pack, a relatively large capacity storage capacitor (supercap), etc.

The detection of an unauthorized power down event by the monitoring circuit 132 results in the forwarding of a power down trigger signal by the monitoring circuit 132 to the controller 102, which in turn proceeds to direct the secure erasure of data from the memory array 108. In some cases, a panic button, such as a physical switch 139 accessible on the storage device (e.g. a spring loaded plunger, a proximity detector, etc.), may be depressed (or released) to initiate the secure erasure operation.

Figure 6:
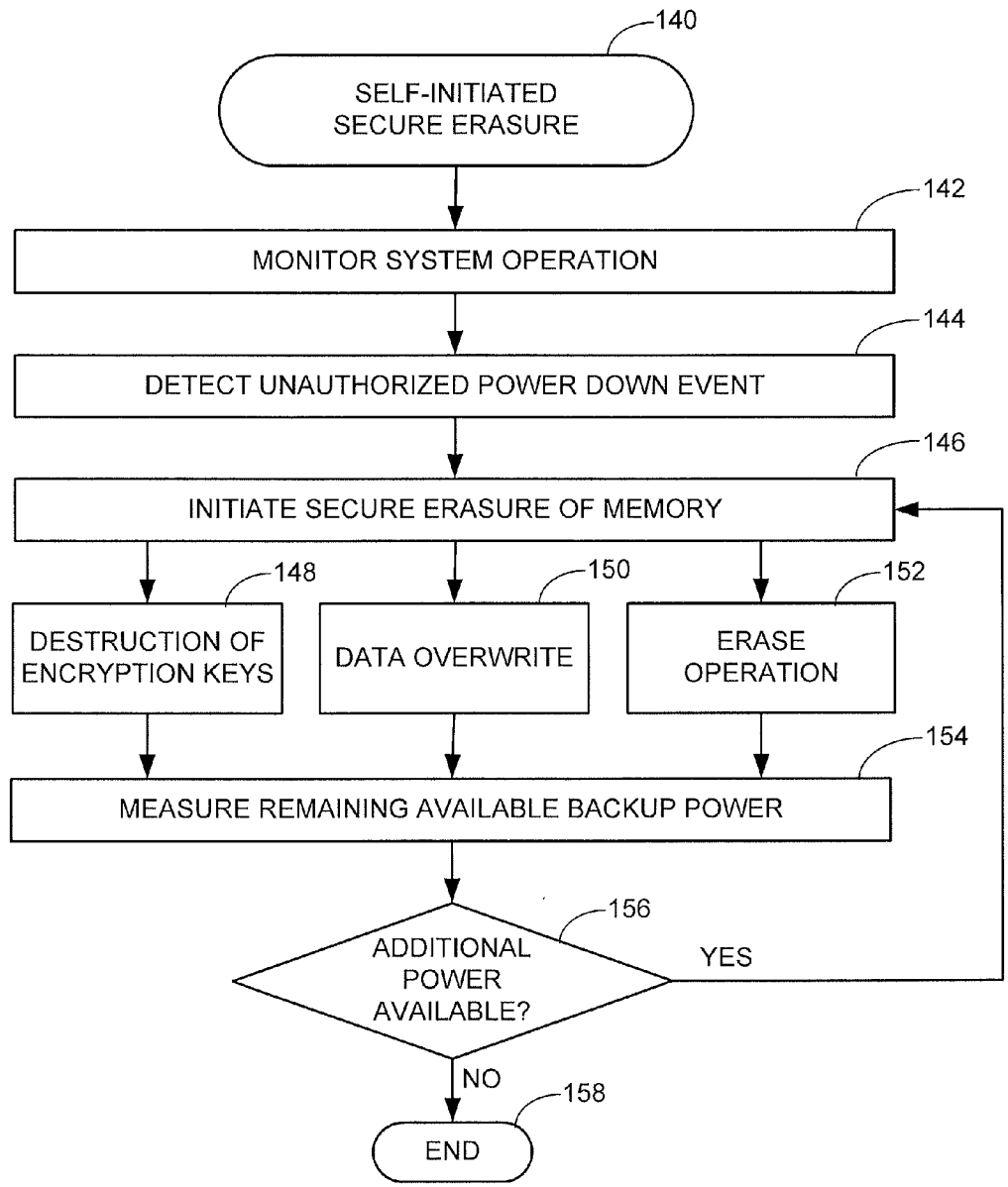
FIG. 6 is a flowchart for a routine illustrative of steps carried out in accordance with various embodiments.

FIG. 6 is a flow chart for a SELF-INITIATED SECURE ERASURE routine 140, generally representative of steps carried out in accordance with various embodiments. As noted above, the self-initiated, non-destructive secure erasure (sanitizing) operation is carried out in stand-alone fashion by a data storage device (such as 100) response to the detection of an unauthorized power down event, and is initiated independently of receipt by the data storage device of a command from a host device (such as 101) to carry out such secure erasure processing.

System operation is monitored by the monitoring circuit 132, as shown by step 142. Upon detection of an unauthorized power down event, step 144, the system proceeds to initiate the secure erasure of the memory 108, step 146. A variety of triggering events can be used to indicate an unauthorized power down event. Without limitation, various examples of trigger events include the following.

One example of a triggering event is the detection of a condition in which the host 101 ceases to issue or respond to periodic "heart beat" authentication signals passed between the storage device 100 and the host 101. A timeout condition might be used to detect an unauthorized power down event by detecting an extended elapsed period of time during which no host activity is detected.

Another example may be the detection of the loss of applied power to the device without the presence of a corresponding "authorization" signal indicating that the power down event is benign (e.g., a scheduled shutdown, an inadvertent power outage, etc.). Physical intrusion into the device is another example of an unauthorized power down event. The device can be configured to detect physical tampering of the device, such through the use of an accelerometer or other circuitry of the monitoring circuit or by detection of the opening of the device housing. Watchdog routines can be implemented to detect firmware tampering, unauthorized access (e.g., computer hacking), loss of connection to DRAM, etc.

The device may be configured with a "dead-man" type switch such that, once armed, failure to receive a periodic "still okay" signal outside normal parameters results in self-initiation of the secure erasure. In some cases, a panic button, such as a physical switch accessible on the storage device (e.g. a spring loaded plunger, a proximity detector, etc.), may be depressed (or released) to initiate the secure erasure operation. Unauthorized physical disconnection of cables may represent yet another triggering event.

Regardless of the manner in which the unauthorized power down event is detected, the routine of FIG. 6 proceeds from step 146 to initiate the purging of data from the memory 108. This can be carried out in a variety of alternative approaches. In some embodiments, the system may proceed to destroy the various encryption keys in the system used to encrypt the data, step 148. For example, storing all of the encryption keys in a specially designated erasure block (FIG. 5) would allow the use of a simple erasure operation upon that block to wipe away the encryption keys, thereby denying access to the data stored on the device. Other mechanisms for non-destructively purging the encryption keys can be used.

Another alternative sanitizing operation involves the overwriting of various data cells with new data, such as shown by step 150. For example, all of the flash memory cells storing data in the array could be subjected to a data overwrite operation whereby new data are written onto the existing states of the cells, such as all logical 0's. Other alternative approaches can be used, such as through the writing of random data, the writing of bit-inverted data, etc. Yet another alternative sanitizing operation involves an erase operation upon the various GCUs in the system, step 152.

These and other sanitizing operations may take different amounts of time and/or power to complete, and may provide different levels of thoroughness with regard to removing the data signal signatures of the sanitized data. Accordingly, in further embodiments, the routine of FIG. 6 continues to step 154 in which a determination is made, such as by the monitoring circuit 132, of how much remaining backup power is available to continue data sanitizing efforts. The determination may be made using other factors, such as remaining time, etc.

If further data sanitizing efforts can be made, the routine passes back from decision step 156 to step 146. In some embodiments, a cascaded, sequential data sanitizing effort is applied. For example, encryption keys for all of the data may be destroyed first, thereby denying access to the data at least for casual attackers. If additional power and/or time is available, the system might continue with a data overwrite operation, followed by erase operations at the erasure block or GCU level. The processing continues in this manner until no further available time or power remains, after which the process ends at step 158. It is contemplated that at the conclusion of the routine, the device will have been sanitized and no useful data may be recovered from it.

In some embodiments, a hierarchy of data classification may be maintained by the device, so that only the most sensitive and important data are destroyed, or such data receive a greater data erasure effort as compared to other data in the memory.

In still further embodiments, high level data encryption might be applied to data on the device without retention of keys (or the use of secret keys within the hardware not accessible from motivated attackers) so that the data are rendered undiscoverable without necessarily being removed completely from the device. This latter approach may be useful in situations where ultimate recovery of the data by authorized parties is desired, should physical recovery of the device be possible.

Figure 7:
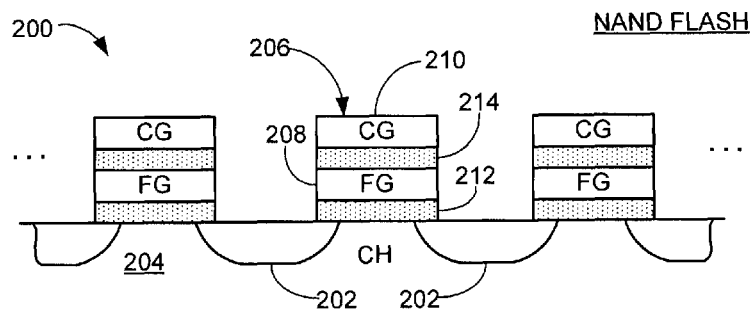
FIG. 7 illustrates flash memory cells adapted for use in the memory of FIG. 1.

Benefits associated with the self-initiated secure data erasure processing of FIG. 6 in the context of a flash memory array can be understood with reference to FIG. 7, which illustrates a number of flash memory cells 200. The memory cells are arranged in a NAND configuration and include localized doped regions 202 in a semiconductor substrate 204. A gate structure 206 is provided between each adjacent pair of the doped regions 242 so that each cell takes a general nMOSFET configuration.

Each gate structure 206 includes a floating gate (FG) 208, a control gate (CG) 210 and intervening isolation regions 212, 214. Data are stored by accumulating charge on the floating gate 218. The presence of accumulated charge raises the threshold voltage required on the control gate 220 place the cell in a drain-source conductive state across channel CH. A separate erasure operation is required to remove accumulated charge from the floating gate.

The cells can be configured as multi-level cells (MLC) through the storage of multiple states. For example, four different levels of accumulated charge (from substantially no charge to a maximum level of charge) can be used to enable each MLC to store 2 bits of data (e.g., 11, 10, 01, 00). Due to the need to carry out a separate erasure operation to remove the storage state of previously programmed cells, it will readily apparent that the data overwrite operation can be used to bring the floating gates of the associated cells to the maximum level of charge (e.g., writing each MLC to the state "00"). Similarly, single level cells (SLCs) that store a single bit in each cell (e.g., a 1 or 0) can be overwritten to bring the floating gates to the maximum level of charge (e.g., writing each SLC to the state "0").

In alternative embodiments, other charge levels can be controllably selected for application to the floating gate. For example, bit-inverted data (with respect to the data presently stored by the cells) can be written, so that the cell can be read and if it stores a first logic level (e.g., a logic 0), then a bit-inverted representation of that level (e.g., a logic 1) can be written to that cell. In other embodiments, random bits can be generated by a random bit generator and written to the cells. In still further embodiments, non-standard amounts of charge can be applied to the floating gates (e.g., some amount of charge that is greater than a first state and less than a second state).

A variety of laboratory techniques are available to a motivated attacker and can be used to detect previously stored states of flash memory cells such as 200, even after multiple erasures and data overwrites have been applied. Accordingly, the use of multiple writes/erasures as well as the use of different encryption keys each time the latest version of a particular data set is written can enhance system security.

Figure 8:
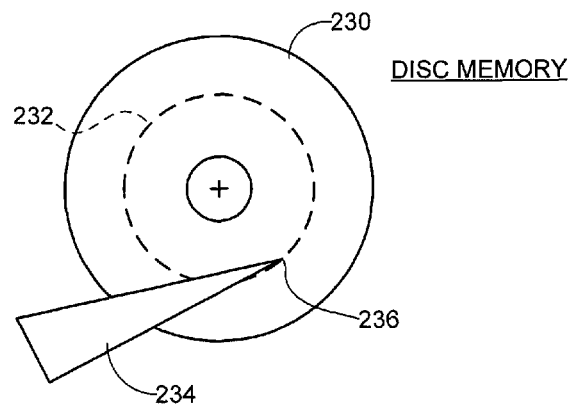
FIG. 8 shows a rotatable medium adapted for use in the memory of FIG. 1.

While the foregoing embodiments have been directed to flash memory cells, it will be appreciated that the self-initiated secure erasure processing discussed above can be readily adapted for other types of memory. FIG. 8 shows a disc memory 230 adapted to store data in the form of magnetization transitions along concentric tracks 232 defined on the disc recording surface. A moveable actuator 234 is used to align a data read/write transducer 236 with the respective tracks to read data from and write data to the tracks.

In some embodiments, the tracks are divided up into a number of concentric zones, with each zone having an associated band key that is incorporated in the encryption processing of all the data stored in that zone. Hence, one alternative approach is to write each new copy of a particular data set to a different zone, thereby providing each copy with a different band key. Such band-based processing can be similarly applied to other forms of memory including the flash memory array discussed above.

Figures 9, 10:
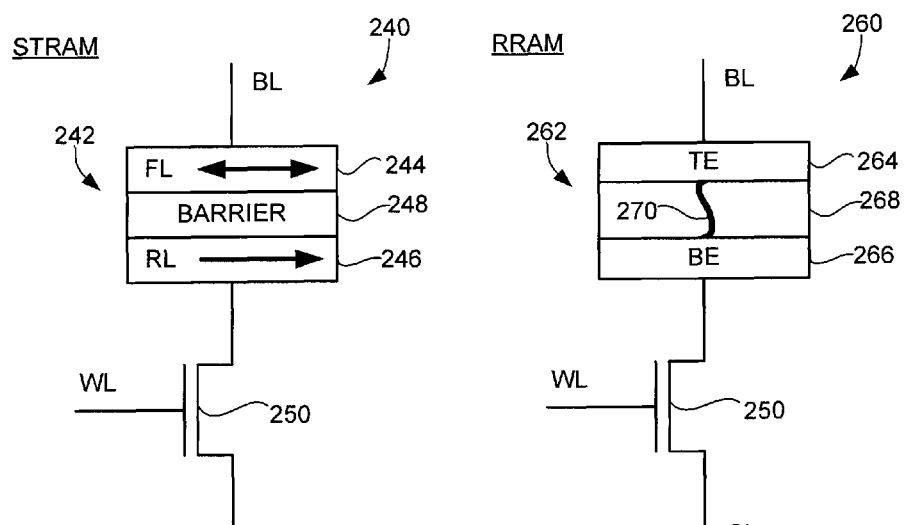
FIG. 9 provides a spin-torque transfer random access memory (STRAM) cell adapted for use in the memory of FIG. 1.
FIG. 10 shows a resistive random access memory (RRAM) cell adapted for use in the memory cell of FIG. 1.

FIG. 9 shows another memory configuration in which the self-initiated secure erasure processing set forth herein can be readily implemented. The memory is formed from an array of spin-torque transfer random access memory (STRAM) cells 240. Each memory cell comprises a magnetic tunneling junction 242 with a variable magnetization free layer 244, a fixed magnetization reference layer 246, and an intervening barrier layer 248. The MTJ 242 is in series with a switching device 250, characterized as an nMOSFET.

Data are stored by the MTJ 242 in relation to the orientation of the free layer 244 relative to the reference layer 246. Generally, the MTJ 242 may exhibit a lower relative electrical resistance in a parallel state, and a higher electrical resistance in an antiparallel state. The programmed state of the cell 240 can be sensed in relation to a voltage drop across the cell responsive to a low magnitude read current.

FIG. 10 sets forth another memory configuration in which the disclosed self-initiated secure erasure methodology can be used. The memory constitutes an array of resistive random access memory (RRAM) cells 260. Each cell has a programmable resistive element 262 formed from opposing electrodes 264, 266 and an intervening oxide layer 268. A filament 270 can be selectively formed across the oxide layer (and subsequently removed) to alter the overall resistance of the memory cell 260. As before, the element 260 can be placed in series with a switching device 250 to provide selective access to the individual cells.

It will be understood that the various embodiments disclosed herein can provide a number of benefits over the art. The ability of a device to self-initiate a secure erasure in accordance with the foregoing discussion can ensure that data, particularly but not limited to sensitive data such as military and governmental classified data, are safely protected from discovery. Physically grabbing a data storage device from a RAID rack, for example, may result in the entire contents of the device being wiped by the time the perpetrator reaches the door. Personnel with storage devices in hazardous or dangerous environments can quickly and thoroughly ensure complete sanitization of data from a memory.

While a variety of types and styles of memories have been disclosed, such are merely exemplary as the various techniques set forth herein can be adapted to a wide variety of applications and environments Nothing disclosed in the foregoing illustrative embodiments is intended or contemplated as being essential for implementation or limiting to the scope of the claimed subject matter. For purposes of the appended claims, the term "unauthorized power down event" will be understood consistent with the foregoing discussion to describe an event detected by a storage device that causes the device to self-initiate a secure erasure of data independently of receipt of a command from a host device to initiate said secure erasure.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
operating a data storage device in communication with a host device, the data storage device comprising a non-volatile memory;
detecting a timeout condition comprising an elapsed period of time during said operation of the data storage device during which no communication signals from the host device are received by the data storage device; and
performing a self-initiated, non-destructive secure erasure of data stored in the memory responsive to the detected timeout condition in which the secure erasure, responsive to an available amount of remaining backup power, comprises destroying at least one encryption key stored in the memory used to encrypt said data.

2. The method of claim 1, in which the at least one encryption key is at least one of a plurality of encryption keys, in which all of the plurality of encryption keys are stored in a specifically designated erasure block such that the secure erasure of the performing step operates upon the block to wipe away all of the plurality of encryption keys.

3. The method of claim 1, in which the secure erasure of the performing step comprises overwriting existing data in the memory with new data.

4. The method of claim 1, in which the secure erasure of the performing step comprises an erase operation upon a garbage collection unit (GCU) of the memory.

5. The method of claim 1, in which the secure erasure of the performing step comprises applying a first type of secure erasure operation upon the memory to sanitize said data therefrom, determining the available amount of remaining backup power, and subsequently selecting a different, second type of secure erasure upon the memory to further sanitize said data therefrom responsive to the available amount of remaining backup power.

6. The method of claim 1, wherein operating the data storage device in communication with the host device comprises periodically issuing heart beat authentication signals by the host device to the data storage device, and wherein detecting the timeout condition comprises a failure to receive one or more of the heart beat authentication signals within said elapsed period of time during said continued operation of the data storage device.

7. The method of claim 1, in which the memory stores user data from the host device and metadata associated with the user data, and the self-initiated secure erasure purges both said user data and said metadata from the memory.

8. The method of claim 1, in which the data comprises multiple copies of host data having a common logical address and different physical addresses within the memory to form an extended data set, and the self-initiated secure erasure removes the extended data set from the memory.

9. The method of claim 1, in which the data storage device further includes a monitoring circuit, the monitoring circuit detecting said timeout condition by initiating the elapsed period of time and failing to detect receipt of a heart beat authentication signal from the host device prior to conclusion of the elapsed period of time.

10. The method of claim 1, wherein the data storage device is operated in communication with the host device using electrical power applied to the data storage device from an external power source, and wherein both the timeout condition is detected and the secure erasure is performed during continued application of the electrical power to the data storage device from the external power source.

11. A data storage device comprising:
a non-volatile memory which stores host data from a host device;
a monitoring circuit adapted to detect a timeout condition comprising an elapsed period of time during continued powered operation of the device during which no communication signals from the host device are received by the data storage device; and
a data storage device controller adapted to self-initiate a non-destructive secure erasure of the host data independently of receipt of a command from the host device to perform said secure erasure responsive to the detected timeout condition.

12. The data storage device of claim 11 wherein the monitoring circuit is further adapted to detect a loss of applied power to the data storage device, to identify the loss of applied power as an authorized power down event responsive to failure to receive said corresponding authorization signal, and wherein the controller is further adapted to initiate a non-destructive secure erasure of the host data independently of receipt of a command from the host device to perform said secure erasure responsive to a detected unauthorized power down event by the monitoring circuit.

13. The data storage device of claim 11, in which the secure erasure comprises overwriting existing data in the memory with new data.

14. The data storage device of claim 11, further comprising a backup power supply which provides backup power for the storage device to carry out the self-initiated secure erasure responsive to a disruption of available power from a normal power supply of the storage device.

15. The data storage device of claim 11, further comprising a mechanical switch coupled to the storage device, wherein the controller further self-initiates the secure erasure responsive to activation of said switch.

16. The data storage device of claim 11, in which the secure erasure comprises destroying all of a plurality of encryption keys stored in the memory used to encrypt said data, responsive to an available amount of remaining backup power.

17. A data storage device comprising:
a non-volatile memory which stores host data;
a monitoring circuit adapted to detect a timeout condition comprising an elapsed period of time during continued powered operation of the device during which no communication signals from the host device are received by the data storage device;
a controller adapted to self-initiate a non-destructive secure erasure of the host data responsive to the monitoring circuit detecting the timeout condition; and
a specifically designated erasure block in the memory configured to store a plurality of encryption keys used to encrypt said data, such that the secure erasure carried out by the controller operates upon the block to destroy all of the plurality of encryption keys.

18. The data storage device of claim 17, further comprising a device housing, wherein the monitoring circuit further detects an unauthorized opening of the device housing, and wherein the controller further self-initiates a non-destructive secure erasure of the host data responsive to the detected unauthorized opening of the device housing.

19. The data storage device of claim 17, wherein the monitoring circuit comprises an accelerometer, and wherein the monitoring circuit detects physical tampering of the data storage device responsive to an output signal from the accelerometer, and wherein the controller is further configured to self-initiate a non-destructive secure erasure of the host data responsive to the detected physical tampering of the data storage device.

20. The data storage device of claim 17, wherein the monitoring circuit is further adapted to detect physical tampering of the data storage device by an unauthorized user, the physical tampering comprising an unauthorized physical disconnection of a communication cable from the data storage device, and wherein the controller is further configured to self-initiate a non-destructive secure erasure of the host data responsive to the detected physical tampering of the data storage device.

* * * * *

UNITED STATES PATENT AND TRADEMARK OFFICE
CERTIFICATE OF CORRECTION

PATENT NO. : 8,832,402 B2
APPLICATION NO. : 13/098062
DATED : September 9, 2014
INVENTOR(S) : Ryan James Goss and David Scott Seekins Page 1 of 1

It is certified that error appears in the above-identified patent and that said Letters Patent is hereby corrected as shown below:

In the Claims,

Col. 9, Line 58
insert after responsive -- to receipt of a corresponding authorization signal supplied to the data storage device by the host device, and to identify the loss of applied power as an unauthorized power down event responsive --

Signed and Sealed this
Thirty-first Day of March, 2015

Michelle K. Lee
*Director of the United States Patent and Trademark Office*